United States Patent
Lauvsnes et al.

(10) Patent No.: US 12,286,027 B2
(45) Date of Patent: Apr. 29, 2025

(54) SYSTEM AND METHOD FOR POWER MANAGEMENT

(71) Applicant: Autostore Technology AS, Nedre Vats (NO)

(72) Inventors: Helge Steinbru Lauvsnes, Suldalsosen (NO); Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 186 days.

(21) Appl. No.: 17/754,182

(22) PCT Filed: Sep. 21, 2020

(86) PCT No.: PCT/EP2020/076340
§ 371 (c)(1),
(2) Date: Mar. 25, 2022

(87) PCT Pub. No.: WO2021/058442
PCT Pub. Date: Apr. 1, 2021

(65) Prior Publication Data
US 2022/0289063 A1 Sep. 15, 2022

(30) Foreign Application Priority Data
Sep. 26, 2019 (NO) .................................. 20191163

(51) Int. Cl.
*B60L 53/66* (2019.01)
*B60L 53/64* (2019.01)
(Continued)

(52) U.S. Cl.
CPC ............. *B60L 53/665* (2019.02); *B60L 53/64* (2019.02); *B65G 1/137* (2013.01); *H02J 7/0048* (2020.01);
(Continued)

(58) Field of Classification Search
CPC .... B60L 53/665; B60L 53/64; B60L 2200/44; B60L 2260/54; B60L 53/53; B60L 53/80;
(Continued)

(56) References Cited

U.S. PATENT DOCUMENTS

2004/0130292 A1 7/2004 Buchanan et al.
2011/0282513 A1* 11/2011 Son .......................... B60L 53/64
700/297
(Continued)

FOREIGN PATENT DOCUMENTS

CN 102421632 A 4/2012
CN 104821622 A 8/2015
(Continued)

OTHER PUBLICATIONS

Office Action issued in Chinese Application No. 202080067348.6; Dated Dec. 27, 2023 (8 pages).
(Continued)

*Primary Examiner* — Charles Cai
(74) *Attorney, Agent, or Firm* — Baker Botts L.L.P.

(57) ABSTRACT

A system for power management of an automated storage and retrieval system includes a plurality container handling vehicles with at least one rechargeable power source for handling containers in a three dimensional underlying storage grid, a charging device for charging the at least one rechargeable power source, a power source for supplying power to the storage and retrieval system, and a monitoring system for monitoring energy prices. The monitoring system is configured to continuously update a power manager with energy prices. The power manager is configured to be updated with information regarding the level of charge of the rechargeable power sources and current resources in terms of the capacity and usage requirements of the container handling vehicles. The power manager is configured to
(Continued)

adjust a power strategy of the automated storage and retrieval system according to the energy prices and to control the stored energy as an additional power source for the storage system during periods of high energy cost.

22 Claims, 4 Drawing Sheets

(51) Int. Cl.
*B65G 1/137* (2006.01)
*H02J 7/00* (2006.01)
*H02J 7/34* (2006.01)

(52) U.S. Cl.
CPC .............. *H02J 7/34* (2013.01); *B60L 2200/44* (2013.01); *B60L 2260/54* (2013.01); *H02J 2310/64* (2020.01)

(58) Field of Classification Search
CPC .. B60L 2260/50; B60L 53/60; B60L 2200/40; B65G 1/137; B65G 54/02; B65G 1/0464; B65G 2201/0235; B65G 1/0492; B65G 1/065; H02J 7/0048; H02J 7/34; H02J 2310/64; H02J 1/14; H02J 13/00002; Y02P 90/60; Y02T 10/92; Y02T 10/70; Y02T 10/7072; Y02T 90/12; Y02T 90/167; Y04S 30/12; Y04S 30/14; B60Y 2200/62; G06Q 50/06; G06Q 50/40; G06Q 10/08; Y02B 70/3225
See application file for complete search history.

(56) References Cited

U.S. PATENT DOCUMENTS

| | | | | |
|---|---|---|---|---|
| 2017/0259683 | A1* | 9/2017 | Shimizu | B60L 53/63 |
| 2018/0244467 | A1* | 8/2018 | Hognaland | B65G 1/0478 |
| 2019/0232925 | A1 | 8/2019 | Hognaland et al. | |
| 2021/0011439 | A1* | 1/2021 | Goverde | G05B 15/02 |
| 2021/0276447 | A1* | 9/2021 | Kumar | B60L 53/66 |
| 2021/0370794 | A1* | 12/2021 | Dudar | B60L 53/126 |

FOREIGN PATENT DOCUMENTS

| | | |
|---|---|---|
| CN | 106773715 A | 5/2017 |
| CN | 109328150 A | 2/2019 |
| CN | 109685554 A | 4/2019 |
| EP | 2496436 A2 | 9/2012 |
| EP | 2889176 A2 | 7/2015 |
| EP | 2957450 A1 | 12/2015 |
| EP | 3505387 A1 | 7/2019 |
| JP | 9-124106 A1 | 5/1997 |
| JP | 2014-138534 A1 | 7/2014 |
| NO | 317366 B1 | 10/2004 |
| WO | 2010042550 A2 | 4/2010 |
| WO | 2014090684 A1 | 6/2014 |
| WO | 2015104263 A2 | 7/2015 |
| WO | 2015129301 A1 | 9/2015 |
| WO | 2015193278 A1 | 12/2015 |
| WO | 2017220627 A1 | 12/2017 |

OTHER PUBLICATIONS

Search Report issued in Norwegian Application No. 20191163; Dated Apr. 22, 2020 (2 pages).
International Search Report issued in International Application No. PCT/EP2020/076340, mailed Nov. 17, 2020 (4 pages).
Written Opinion issued in International Application No. PCT/EP2020/076340; Dated Nov. 17, 2020 (7 pages).
Anonymous, Japan Patent Office (JPO), Notice of Reasons for Rejection, Japanese patent application 2022-519212, pub. Oct. 22, 2024 by JPO, Tokyo, Japan, 10 pages (in English).
Anonymous, Japan Patent Office (JPO), Notice of Reasons for Rejection, Japanese patent application 2022-519212, pub. Oct. 22, 2024 by JPO, Tokyo, Japan, 5 pages (in Japanese).
Anonymous, Japan Platform for Patent Information, Machine translation of (JP 2014-138534) received from JPPI in Oct. 2024, in English, 15 pages.
Anonymous, Japan Platform for Patent Information, Machine translation of (JP H9-124106) received from JPPI in Oct. 2024, in English, 7 pages.
Kim Seong-Gon, Notice of Submission of Opinion, Korean patent application KR1020227013368, mailed Dec. 20, 2024, KIPO, Daejeon, KR, 10 pages (with English translation).

* cited by examiner

SYSTEM AND METHOD FOR POWER MANAGEMENT

TECHNICAL FILED

The present invention concerns a system and a method for power management of an automated storage and retrieval system, and more particularly a system and a method for power management of an automated storage and retrieval system wherein the power management is dependent on the current and upcoming energy prices.

BACKGROUND AND PRIOR ART

Figure 1:
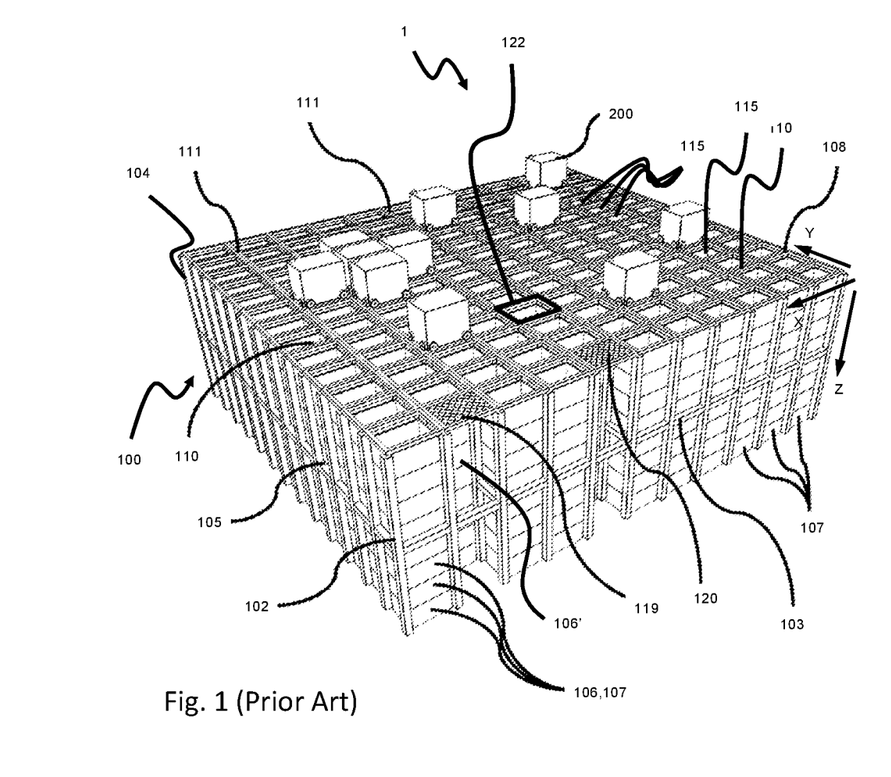
FIG. 1 is a perspective view of a prior art storage grid 104 with container handling vehicles running on top.
Figure 2:
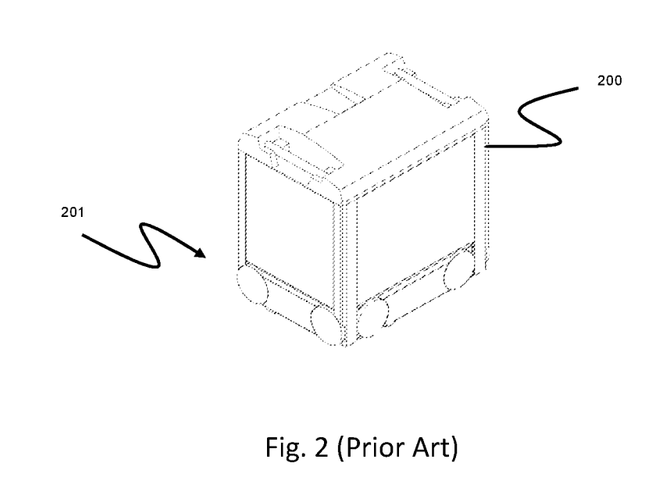
FIG. 2 is a perspective view of a prior art container handling vehicle having a centrally arranged cavity for containing storage containers 106 therein.
Figure 3:
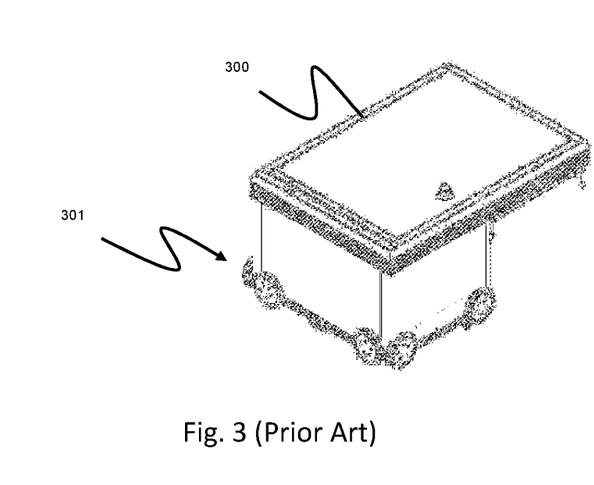
FIG. 3. is a perspective view of a prior art container handling vehicle having a cantilever for containing storage containers 106 underneath.

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises several upright members 102 and several horizontal members 103 which are supported by the upright members 102. The members 102, 103 may typically be made of metal, e.g. extruded aluminium profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 201, 301 are operated to raise storage containers 106 from, and lower storage containers 106 into, the storage columns 105, and to transport the storage containers 106 above the storage columns 105. The rail system 108 comprises a first set of parallel rails 110 arranged to guide movement of the container handling vehicles 201, 301 in a first direction X across the top of the frame structure 100, and a second set of parallel rails 111 arranged perpendicular to the first set of rails 110 to guide movement of the container handling vehicles 201, 301 in a second direction Y which is perpendicular to the first direction X. In this way, the rail system 108 defines grid columns 115 above which the container handling vehicles 201, 301 can move laterally above the storage columns 105, i.e. in a plane which is parallel to the horizontal X-Y plane.

Each prior art container handling vehicle 201, 301 comprises a vehicle body 201a, 301a, and first and second sets of wheels 201b, 301b, 201c, 301c which enable the lateral movement of the container handling vehicles 201, 301 in the X direction and in the Y direction, respectively. In FIGS. 2 and 3 two wheels in each set are fully visible. The first set of wheels 201b, 301b is arranged to engage with two adjacent rails of the first set 110 of rails, and the second set of wheels 201c, 301c is arranged to engage with two adjacent rails of the second set 111 of rails. Each set of wheels 201b, 301b, 201c, 301c can be lifted and lowered, so that the first set of wheels 201b, 301b and/or the second set of wheels 201c, 301c can be engaged with the respective set of rails 110, 111 at any one time.

Each prior art container handling vehicle 201, 301 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a grid column 115, i.e. the extent of a grid column 115 in the X and Y directions, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a grid column 115, e.g. as is disclosed in WO2014/090684A1.

In the X and Y directions, neighbouring grid cells are arranged in contact with each other such that there is no space there-between.

In a storage grid 104, most of the grid columns 115 are storage columns 105, i.e. grid columns 105 where storage containers 106 are stored in stacks 107. However, a grid 104 normally has at least one grid column 115 which is used not for storing storage containers 106, but which comprises a location where the container handling vehicles 201, 301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 115 in which the port is located may be referred to as a 'port column' 119, 120. The transportation to the access station may be in any direction, that is horizontal, tilted and/or vertical. For example, the storage containers 106 may be placed in a random or dedicated grid column 115 within the storage grid 104, then picked up by any container handling vehicle and transported to a port 119, 120 for further transportation to an access station. Note that the term 'tilted' means transportation of storage containers 106 having a general transportation orientation somewhere between horizontal and vertical.

When a storage container 106 stored in the grid 104 disclosed in FIG. 1 is to be accessed, one of the container handling vehicles 201, 301 is instructed to retrieve the target storage container 106 from its position in the grid 104 and transport it to the drop-off port 119. This operation involves moving the container handling vehicle 201, 301 to a grid location above the storage column 105 in which the target storage container 106 is positioned, retrieving the storage container 106 from the storage column 105 using the container handling vehicle's 201, 301 lifting devices (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers 106 prior to lifting the target storage container 106 from the storage column 105. This step, which is sometimes referred to as "digging" within the art, may be performed with the same container handling vehicle that is subsequently used for transporting the target storage container 106 to the drop-off port 119, or with one or a plurality of other cooperating container handling vehicles. Alternatively, or in addition, the automated storage and retrieval system 1 may have container handling vehicles specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns.

When a storage container 106 is to be stored in the grid 104, one of the container handling vehicles 201, 301 is instructed to pick up the storage container 106 from the pick-up port 120 and transport it to a grid location above the storage column 105 where it is to be stored. After any storage containers 106 positioned at or above the target position within the storage column stack 107 have been removed, the container handling vehicle 201, 301 positions the storage container 106 at the desired position. The removed storage containers 106 may then be lowered back into the storage column 105 or relocated to other storage columns.

For monitoring and controlling the automated storage and retrieval system 1, e.g. monitoring and controlling the location of respective storage containers 106 within the grid 104, the content of each storage container 106; and the movement of the container handling vehicles 201, 301 so that a desired storage container 106 can be delivered to the desired location at the desired time without the container handling vehicles 201, 301 colliding with each other, the automated storage and retrieval system 1 comprises a control system which typically is computerized and which typically comprises a database for keeping track of the storage containers 106.

In addition to installation, the biggest cost in operating an automated storage system, is the cost of the energy consumed by the container handling vehicles in their daily operations. It is therefore an object of the present invention to reduce this cost.

SUMMARY OF INVENTION

The present invention is set forth and characterized in the independent claims, while the dependent claims describe other characteristics of the invention.

A preferred embodiment of the present invention is defined by a system for power management of an automated storage and retrieval system comprising a plurality container handling vehicles with at least one rechargeable power source for handling containers in a three dimensional underlying storage grid, a charging device for charging the at least one rechargeable power source, a power source for supplying power to the storage and retrieval system, a monitoring system for monitoring energy prices, wherein said monitoring system is configured to continuously update a power manager with energy prices, and the power manager is configured to receive information regarding the level of charge of the rechargeable power sources and current resources in terms of the capacity and usage requirements of the container handling vehicles, and said power manager is configured to adapt a power strategy of the automated storage and retrieval system according to the energy prices.

Further the power manager is configured to control charging of the rechargeable power source(s) during periods of low energy cost and to control the stored energy as an additional power source for the storage system during periods of high energy cost and to use a ranking system to decide in which order to charge two or more rechargeable power sources and to control storing of energy. The monitoring system monitors present and upcoming energy prices.

Also, the power source can receive power via locally generated energy from renewable energy sources and/or grid power.

The ranking system of the power manager is configured to decide to charge the rechargeable power sources with the highest charging level first and to decide to use the rechargeable power sources with the highest charging level as an additional power source first.

The charging device can be a charging station or a charging robot, and at least one large capacity battery can be used for storing energy during periods of low energy cost.

A preferred embodiment of the present invention is further defined by a method for power management of an automated storage and retrieval system comprising: a plurality of container handling vehicle, with at least one rechargeable power source for handling containers in a three-dimensional underlying storage grid, a charging device for charging the rechargeable power source of the container handling vehicle, a power source for supplying power to the storage system, a monitoring system for monitoring energy prices, the method comprises the following steps: letting the monitoring system establish external power information by: reading present power consumption, and updating present and upcoming energy cost, letting the monitoring system establish internal power information by: acquiring the current energy state of the automated storage and retrieval system, and estimating the future energy state of the automated storage and retrieval system, letting the power manager update the power strategy of the system according to the external and internal power information.

The power strategy of the system may be updated by letting the power manager use a ranking system to decide in which order to charge the rechargeable power sources and/or letting the ranking system of the power manager decide to charge the rechargeable power sources with the highest charging level first and/or letting the ranking system of the power manager decide to use the rechargeable power sources with the highest charging level as an additional power source first.

By letting a power manager control the charging of the rechargeable power sources dependent on the prices of power it is possible to reduce the cost of power in a storage system. The rechargeable power sources may be used as an additional power source for the system when the prices are high. This additional power source allows the storage system to store power when prices are low and use the stored power when prices are high. By incorporating a power manager that controls the flow of power to or from the rechargeable power sources, the cost of operating the storage system can be reduced greatly and the problem with the operation cost of an automated storage system can be solved.

BRIEF DESCRIPTION OF THE DRAWINGS

The following drawings are appended to facilitate the understanding of the invention. The drawings show embodiments of the invention, which will now be described by way of example only, where.

DETAILED DESCRIPTION

In the following, the invention will be discussed in more detail with reference to the appended drawings. It should be understood, however, that the drawings are not intended to limit the invention to the subject-matter depicted.

A typical prior art automated storage and retrieval system 10 with a framework structure 100 was described in the background section above.

The container handling vehicle rail system 108 allows the container handling vehicles 201 to move horizontally between different grid locations, where each grid location is associated with a grid cell 122.

In FIG. 1, the storage grid 104 is shown with a height of eight grid cells 122. It is understood, however, that the storage grid 104 can in principle be of any size. The storage grid 104 can be considerably wider and/or longer than disclosed in FIG. 1. For example, the grid 104 may have a horizontal extent of more than 700×700 storage columns 105. Also, the grid 104 can be considerably deeper than disclosed in FIG. 1. For example, the storage grid 104 may be more than twelve grid cells 122 deep, i.e. in the Z direction indicated in FIG. 1.

FIG. 2 is a perspective view of a prior art container handling vehicle having a centrally arranged cavity for containing storage containers 106 therein.

The central cavity container handling vehicles 201 may have a footprint that covers an area with dimensions in the X and Y directions which is generally equal to the lateral extent of a grid column 115, i.e. the extent of a grid column 115 in the X and Y directions, e.g. as is described in WO2015/193278A1, the contents of which are incorporated herein by reference.

Alternatively, the central cavity container handling vehicles 101 may have a footprint which is larger than the lateral area defined by a grid column 115, e.g. as is disclosed in WO2014/090684A1.

FIG. 3 is a perspective view of a prior art container handling vehicle having a cantilever for containing storage containers 106 underneath.

Figure 4:
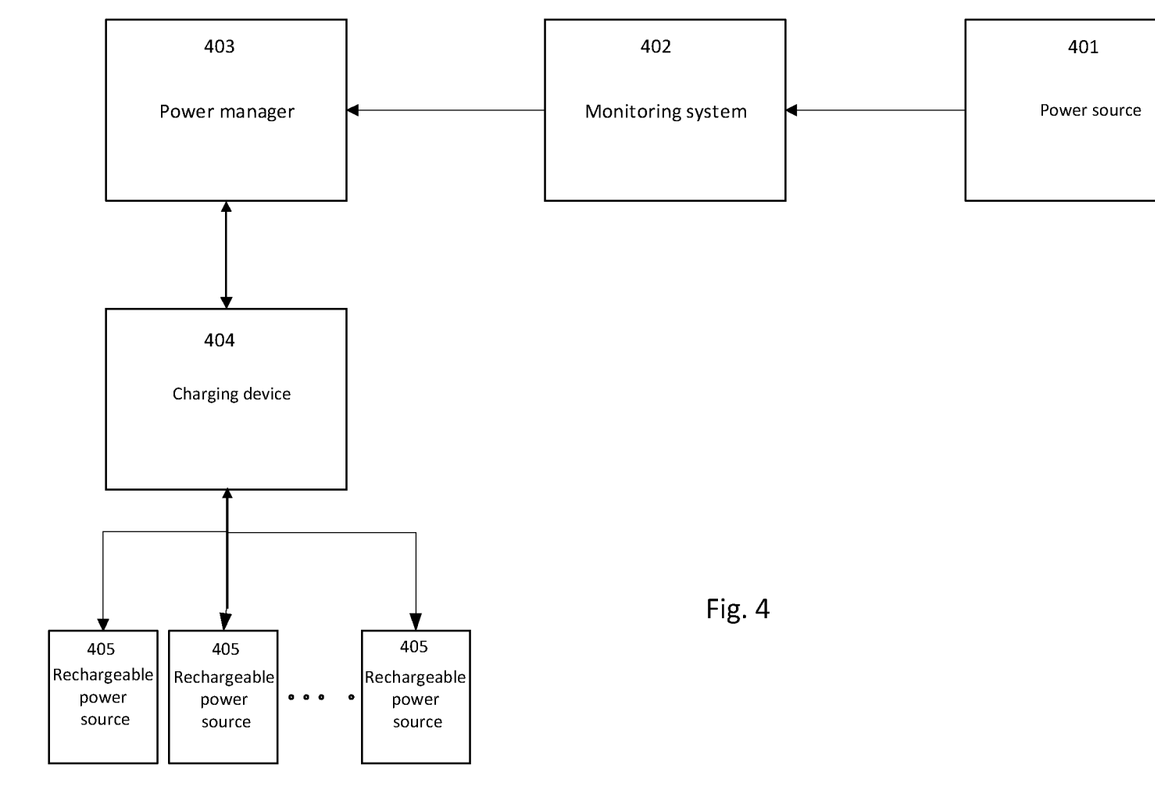
FIG. 4 is a box drawing of the different modules of the present invention and how they are connected.

FIG. 4 is a box drawing of the different modules of the present invention and how they are connected. The storage system receives power from at least one power source 401. The power source 401 can be either grid power or locally generated power from renewable power sources. Power can further be stored in rechargeable power sources comprised in the system. In a preferred embodiment the storage system 1 receives both grid power and locally generated power from renewable power sources. Locally generated power from renewable power sources can be wind power, hydro power, solar power or any other power source that is available. The amount of available power and the cost of the power is monitored by a monitoring system 402. The monitoring system 402 can receive power information about available power and current cost of power from the grid provider, as well as an estimate of costs of power for an upcoming time period. The upcoming time period may for instance be the next 24 hours or even further ahead in time.

The monitoring system 402 sends the power information to a power manager 403. The power manager 403 controls how the power required for the operation of the system is distributed and how much power should be drawn from the grid power, how much should be drawn from the locally generated power from renewable power sources and/or how much power should be drawn from the power stored in rechargeable power sources of the system. The power manager also controls if grid power or power from renewable power sources should be used for charging the rechargeable power sources.

The power manager 403 is in control of at least one charging device 404, The charging device 404 is used to charge at least one rechargeable power source 405. In a preferred solution there is a plurality of rechargeable power sources 405 stored at a plurality of different charging devices 404. These rechargeable power sources 405 can be batteries used for powering the container handling vehicles 200, 300. Alternatively, or additionally, the rechargeable power sources 405 can be battery packs, whose sole purpose is to store energy when the conditions are right for the locally generated renewable power sources to produce a surplus of energy and when the prices for grid power are low.

The charging device 404 can both charge the rechargeable power sources 405 and draw power from the rechargeable power sources 405. The power is directed to the charging devices 404 from either the power grid and/or the locally renewable power sources. The power manager 403 can control the distribution of the power e.g. that some energy is stored for later use, some energy is used for charging rechargeable power sources 405 of the container handling vehicles 200, 300 and some energy is used to operate the rest of the system.

The stored power can be directed from the rechargeable power sources 405 via the charging devices 404 to power the rest of the storage system.

Figure 5:
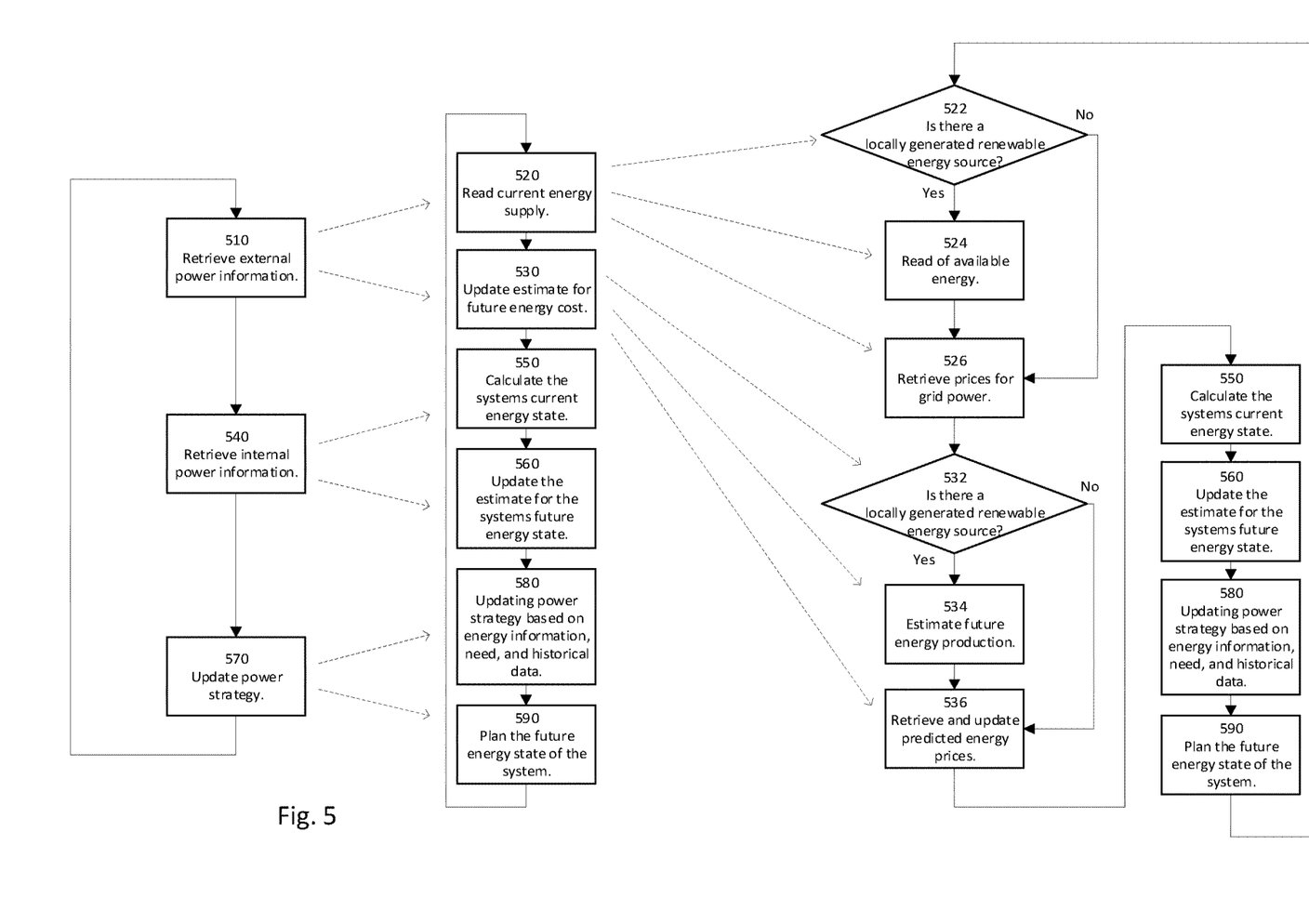
FIG. 5 is a flow chart of the different steps of the method.

FIG. 5 is a flow chart showing the different steps of the method according to a preferred embodiment of the present invention.

In this embodiment the storage system first retrieves external power information 510. This requires retrieving information of the current energy supply 520 and updating the estimate for the future cost of energy 530.

For obtaining information regarding the current energy supply 520, the first step is to check if there is locally generated renewable energy available 522. The amount of available energy from a locally generated energy source is retrieved 524. The next step is to retrieve information of the prices for grid power 526. This can be obtained via e.g. downloading information from the internet.

The next step is to estimate future energy cost 530. If the system is connected to a locally generated renewable energy source 532 the future energy production from this source is estimated 534. This is done by collecting information like weather data, time of day and which season it is in order to estimate the available amount of future energy from the locally generated renewable energy source. Further, the predicted prices for the future grid energy is retrieved and updated 536.

The next step is to retrieve internal power information 540.

Retrieving the internal power information 540 comprises the step of calculating the systems current energy state 550. The current energy state can comprise information regarding how much energy that is stored in the system at the current time. Information regarding the current energy consumption of the system is also retrieved. The current consumption depends on how many container handling vehicles are operating, how many rechargeable power sources are charging in the charging devices and how much energy is consumed by the rest of the system, e.g. by the ports, conveyer belts and such.

Retrieving the internal power information also involves the step of updating the estimate for the systems future energy state 560. This comprises estimation of the energy need for the current and upcoming activities. Further the historical data can be used in order to improve the estimates. The historical data can be used in machine learning and in artificial intelligence in order to improve the accuracy of the estimated future power consumption.

The final step is to update the power strategy 570. The updating of the power strategy 570 involves a first step 580 of updating the retrieved power information, both internal 540 and external 510, and the energy need, and using historical data to optimize the charging strategy of the power manager 403.

Updating the power strategy finally involves planning the future energy state of the system 590. If the cost of energy is low, or there is high production of locally generated renewable energy, the power manager will try to increase the stored energy in the system by charging the rechargeable energy sources more often and for a longer period of time. This is planned in relation to the activity of the system where any reduction to operational efficiency is also minimised.

When all steps are done the power manager 403 starts the process over again and the power manager is hence updated continuously by receiving or retrieving information about the energy prices, charging status of the rechargeable power sources, and the internal and external power information.

In an alternative embodiment of the present invention the charging strategy can be set statically. The batteries can be set to charge at fixed time intervals during the day. Instead of collecting estimated future energy cost, the system can be set up with fixed time intervals wherein it is preferred that the storage system increases its state of charge. This will typically be favorable for businesses with a work shift where the charging of the system is set to a time of day when the energy price is at its lowest (typically evening time or night time). Another time of day when the system can be set to increase its state of charge is during lunch time. Basically, any time when the ordinary work force has a down time, it is a good time for increasing the state of charge.

The storage of the power can be in the systems internal supply of batteries. These batteries are the ones in the container handling vehicles. They can be fixed in the container handling vehicles, or they can be exchangeable. In an alternative solution at least one large capacity batteries can be used for storing power, when the prices are low. They are hence not a part of the rechargeable power sources that are used to power the container handling vehicles.

LIST OF REFERENCE NUMBERS

1 Automated storage and retrieval system
100 framework structure
102 upright members
103 horizontal members
104 storage grid
105 storage columns
106 storage container
106' storage container
107 stacks
108 rail system
110 a first set of parallel rails
111 a second set of parallel rails
115 grid column
119 port column
120 port column
122 grid cell
200 container handling vehicle
201 container handling vehicle
300 container handling vehicle
301 container handling vehicle
401 power source
402 monitoring system
403 power manager
404 charging device
405 rechargeable power source
510 external power information
520 current energy supply
522 locally generated renewable energy supply
524 available energy
526 price for grid power
530 estimate for future energy cost
532 locally generated renewable energy supply
534 Future energy production
536 predicted energy prices
540 internal power information
550 the systems current energy state
560 estimate for the systems future energy state
570 power strategy
580 Updating power strategy based on energy information, need and historical data
590 future energy state of the system

The invention claimed is:

1. A system for power management of an automated storage and retrieval system comprising a plurality of container handling vehicles with at least one rechargeable power source for handling containers in a three dimensional underlying storage grid, a charging device for charging the at least one rechargeable power source, a power source for supplying power to the storage and retrieval system,
wherein a power manager is configured to be updated with information regarding a level of charge of the at least one rechargeable power source, energy prices, and current resources in terms of capacity and usage requirements of the container handling vehicles, and said power manager is configured to adjust a power strategy of the automated storage and retrieval system according to the energy prices and to control stored energy as an additional power source for the storage and retrieval system during periods of high energy cost, and said power manager is configured to control storing of energy if future energy prices are lower than an average energy price of a preceding time period.

2. The system according to claim 1, wherein the power manager is configured to control charging of the at least one rechargeable power source during periods of low energy cost.

3. The system according to claim 1, wherein the energy prices include present and upcoming energy prices.

4. The system according to claim 1, wherein the power source receives power from locally generated renewable energy sources and/or grid power.

5. The system according to claim 1, wherein the power manager is configured to decide in which order to charge two or more rechargeable power sources.

6. The system according to claim 5, wherein the power manager is configured to decide to charge the rechargeable power sources with a highest charging level first.

7. The system according to claim 5, wherein the power manager is configured to decide to use the rechargeable power sources with a highest charging level as an additional power source first.

8. The system according to claim 1, wherein energy from locally generated renewable energy sources is used to store energy if future energy prices are lower than an average energy price of a preceding time period.

9. The system according to claim 8, wherein the energy from the locally generated renewable energy sources is used as an additional energy source for the storage and retrieval system if the future energy prices are higher than the average energy price of a preceding time period.

10. The system according to claim 1, wherein the preceding time period is a preceding month.

11. The system according to claim 1, wherein the charging device is a charging station or a charging robot.

12. The system according to claim 1, wherein at least one battery is used for storing energy during periods of low energy cost.

13. A method for power management of an automated storage and retrieval system comprising: a plurality of container handling vehicles, with at least one rechargeable power source for handling containers in a three-dimensional underlying storage grid, a charging device for charging the at least one rechargeable power source of the container handling vehicles, a power source for supplying power to the storage and retrieval system, a monitoring system for monitoring energy prices, the method comprising:
    letting the monitoring system establish external power information by:
    reading present power consumption, and
    updating present and upcoming energy cost,
    letting the monitoring system establish internal power information by:
    acquiring a current energy state of the automated storage and retrieval system, and
    estimating a future energy state of the automated storage and retrieval system,
    letting a power manager update a power strategy of the system according to the external and internal power information,
    letting the power manager control storing of energy in response to that future energy prices are lower than average energy price of a preceding time period, and
    letting the power manager control use of stored energy of the rechargeable power sources as an additional power source for the storage and retrieval system during periods of high energy cost.

14. The method according to claim 13, wherein the power strategy is updated by letting the power manager control charging of the rechargeable power sources.

15. The method according to claim 13, wherein the power strategy is updated by letting the power source receive power from locally generated renewable energy sources and/or grid power.

16. The method according to claim 13, wherein the power strategy is updated by letting the power manager use a ranking system to decide in which order to charge the at least one rechargeable power source.

17. The method according to claim 16, wherein the power strategy is updated by letting the ranking system of the power manager decide to charge the at least one rechargeable power source with a highest charging level first.

18. The method according to claim 16, wherein the power strategy is updated by letting the ranking system of the power manager decide to use the at least one rechargeable power source with a highest charging level as an additional power source first.

19. The method according to claim 13, wherein the power strategy is updated by letting the power manager control storing of energy in response to that future energy prices are lower than an average energy price of a preceding time-period.

20. The method according to claim 13, wherein the power strategy is updated by letting energy from local renewable energy sources be used to store energy in response to that future energy prices are lower than an average energy price of a preceding time-period.

21. The method according to claim 13, wherein the power strategy is updated by letting energy from local renewable energy sources be used as an additional energy source for the storage and retrieval system in response to that future energy prices are higher than an average energy price of a preceding time-period.

22. The method according to claim 19, wherein the preceding time-period is a preceding month.

* * * * *